United States Patent [19]

Ketcham

[11] Patent Number: 4,979,112
[45] Date of Patent: Dec. 18, 1990

[54] METHOD AND APPARATUS FOR ACOUSTIC MEASUREMENT OF MUD FLOW DOWNHOLE

[75] Inventor: Carl C. Ketcham, Bennion, Utah
[73] Assignee: Baker Hughes Incorporated, Houston, Tex.
[21] Appl. No.: 554,081
[22] Filed: Jul. 17, 1990

Related U.S. Application Data

[63] Continuation of Ser. No. 192,530, May 11, 1988, abandoned.

[51] Int. Cl.⁵ .............................................. G01V 1/40
[52] U.S. Cl. .................................. 364/422; 367/83; 175/48
[58] Field of Search ................ 367/81, 82, 83, 84, 367/85; 73/155, 861.27, 861.28; 175/40, 48

[56] References Cited

U.S. PATENT DOCUMENTS

| | | | |
|---|---|---|---|
| 3,800,277 | 3/1974 | Patton et al. | 175/48 |
| 3,896,667 | 7/1975 | Jeter | 175/40 |
| 3,911,726 | 10/1975 | Georgiev | 73/32 |
| 4,078,620 | 3/1978 | Westlake et al. | 175/48 |
| 4,262,343 | 4/1981 | Claycomb | 367/83 |
| 4,265,125 | 5/1981 | Mahany | 73/861.03 |
| 4,655,289 | 4/1987 | Schoeffler | 175/48 |
| 4,694,439 | 9/1987 | Moll | 367/83 |
| 4,739,841 | 4/1988 | Das | 175/45 |
| 4,754,641 | 7/1988 | Orban et al. | 73/155 |
| 4,774,694 | 9/1988 | Moll | 367/83 |
| 4,932,005 | 6/1990 | Birdwell | 367/83 |

FOREIGN PATENT DOCUMENTS

| | | | |
|---|---|---|---|
| 0176522 | 10/1983 | Japan | 73/861.28 |
| 0189562 | 11/1983 | Japan | 73/861.28 |

OTHER PUBLICATIONS

U.S.S.R. Inventor's Certificate, Specification No. 504163, Apr. 20, 1976 Ramsey et al., U.S. Statutory Invention Registration, No. H55, May 6, 1986.

*Primary Examiner*—Jerry Smith
*Assistant Examiner*—David Huntley
*Attorney, Agent, or Firm*—Joseph A. Walkowski; Michael Polacek

[57] ABSTRACT

The flow rate of the drilling mud within a drill string is measured by measuring the doppler frequency shift in an acoustic signal propagated from a first acoustic transducer to a second acoustic transducer laterally separated from the first acoustic transducer. Each of the transducers are disposed within the principal flow of the drilling mud. The degree of doppler shift is a measure of the flow rate of the drilling mud between the two transducers. Variations in the flow rate of the drilling mud as measured by the transducers downhole are used to transmit information or commands from the well surface to a downhole microprocessor coupled to the output of the transducers.

6 Claims, 1 Drawing Sheet

METHOD AND APPARATUS FOR ACOUSTIC MEASUREMENT OF MUD FLOW DOWNHOLE

This application is a continuation of copending application Ser. No. 07/192,530, filed May 11, 1988, now abandoned.

BACKGROUND OF THE INVENTION

1. Field of the Invention

The invention relates to the field of earth boring tools and in particular to apparatus to measure the flow of hydraulic fluid or drilling mud through a drill string.

2. Description of the Prior Art

Control of the petroleum oil well is largely accomplished through the control of mud or hydraulic fluid pumped into the drill string. A result, the drill operators have developed the ability and the means for controlling the flow rate hydraulic mud within the drill string to a degree of reasonable accuracy and control.

On the other hand, the communication with downhole equipment while drilling has been very difficult to achieve with any degree of practical acceptability. Attempts to communicate with downhole equipment from the well surface through electrical means or through mud pulsation techniques have been possible, but often suffer from unreliability under field conditions. Generally, it is very difficult to achieve the signal resolution necessary to unambiguously transmit distinct commands downhole.

Therefore, what is needed is a method and apparatus whereby communication of information downhole can be reliably and unambiguously transmitted under all field conditions.

SUMMARY OF THE INVENTION

The invention is a method for measuring the velocity of a drilling mud within a drill string comprising the steps of generating an acoustic signal at a site within the drill string, and propagating the acoustic signal within the drilling mud flowing through the drill string. Next follows the step of receiving the acoustic signal at a reception site separated from the site of generation of the acoustic signal. The generated acoustic signal is compared to the received acoustic signal to determine the magnitude and sign of any doppler shift between the generated and received acoustic signals. Thereafter the velocity of the drilling mud through the drill string is determined from the doppler shift. As a result the flow velocity within the drill string is unambiguously determined.

In a preferred embodiment, the acoustic signal is propagated in a direction normal to the flow of the drilling mud between the site of generation of the acoustic signal and the site of reception of the acoustic signal.

The method of the invention further comprises selectively varying the flow rate of the drilling mud into the drill string; and converting each determined flow rate corresponding to each selectively varied flow rate established in the drill string into a distinguishable information element.

More generally the method of the invention further comprises the step of repeating the steps of selectively varying, generating, propagating, receiving, comparing, determining and converting to form a sequential plurality of distinguishable information elements, such as bits or digits. The plurality of distinguishable information bits are then assembled into a command word. A downhole function is then executed in response to the command word.

The invention can also be characterized as a method for communicating information from a well platform to a site downhole to a receiving circuit for executing a downhole function. The method comprises the steps of selectively altering mud flow velocity in the drill string. The drill string includes a receiving circuit. Next the downhole mud flow velocity is measured. The measuring is effectuated during a predetermined data time interval. The mud flow velocity downhole is converted into an information element or bit. As a result information is transmitted downhole to the receiving circuit through selective alternation of mud flow velocity in the drill string.

The invention is also an improvement in an apparatus comprising a drill string, and a mechanism, such as conventional mud pumping apparatus, for selectively altering mud flow in the drill string. The improvement comprises a first circuit for measuring mud flow velocity downhole, a second circuit for converting an analog output signal from the first circuit into digital format, a digital processor coupled to the second circuit, the digital processor converts an alteration in mud flow velocity during a predetermined data interval into a distinguishable information element or bit according to conventional principles. By reason of this combination of elements, communication downhole is simply and reliably effectuated.

In particular the digital processor converts a sequential plurality of values of the mud flow velocity into a corresponding sequential plurality of distinguishable information bits or elements, and assembles a command word from the plurality of information bits. The digital processor is responsive to the command word to at least initiate a downhole function within the drill string.

The invention is still further defined as a method for communicating information downhole comprising the steps of acoustically measuring a mud flow velocity downhole, changing mud flow velocity downhole during a predetermined data time interval, determining the magnitude of change of mud flow velocity downhole during the data time interval, and converting a determination of the mud flow velocity downhole during the data time interval into a distinguishable information element or bit.

Yet another way to define the invention is as an apparatus for measuring drilling mud flow velocity within a drill string comprising a first acoustic transducer disposed at a first site within the drill string within a primary flow of drilling mud within the drill string. The invention includes a second acoustic transducer disposed at a second predetermined site within the primary flow of the hydraulic mud within the drill string. The first and second acoustic transducers are laterally separated by a predetermined distance within the drill string. A first circuit is coupled to the first transducer and drives the first acoustic transducer to generate an acoustic signal in the drilling mud. A second circuit is coupled to the second transducer and receives a signal from the second acoustic transducer. A third circuit is coupled to the first and second circuits. The third circuit compares the signal used to drive the first acoustic transducer with the signal received from the second acoustic transducer. The third circuit has an output signal which is a function of the frequency difference between the signal driving the first acoustic transducer and the signal received from the second acoustic transducer. The apparatus further comprises a fourth circuit which converts the output of the third circuit into a signal indicative of flow rate of the drilling mud within the drill string.

The invention and its various embodiments may now be better understood by turning to the detailed description.

DETAILED DESCRIPTION OF THE INVENTION

The flow rate of the drilling mud within a drill string is measured by measuring the frequency shift in an acoustic signal propagated from a first acoustic transducer to a second acoustic transducer laterally separated from the first acoustic transducer. Each of the transducers are disposed within the principal flow of the drilling mud. The degree of doppler shift is a measure of the flow rate of the drilling mud between the two transducers. Variations in the flow rate of the drilling mud as measured by the transducers downhole are used to transmit information or commands from the well surface to a downhole microprocessor coupled to the output of the transducer.

Two acoustical transducer are disposed and separated within a conduit of a drill string in the principal mud flow and across the direction of the mud flow. A doppler shift in the frequency of the acoustic wave traveling through the drilling mud between a transmitting transducer and receiving transducer is therefore indicative of the flow rate of the drilling mud. In the illustrated embodiment, the transmitting transducer is across from the receiving transducer and mounted on the inside cylindrical surface of a section of downhole drill pipe.

Figure 1:
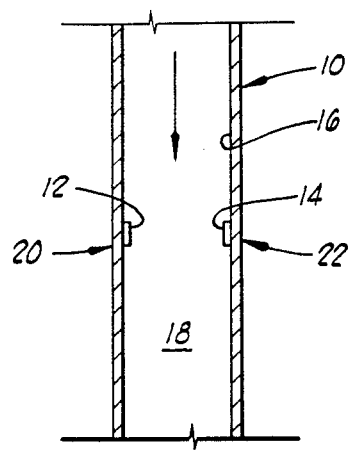
FIG. 1 is a diagrammatic cross-sectional depiction of a portion of a drill string incorporating the invention.

The invention can be better understood by now turning to the diagrammatic cross-sectional depiction of FIG. 1 wherein a section of drill pipe 10 is illustrated with a transmitting transducer 12 and receiving transducer 14 mounted on the inside surface 16 of drill pipe 10. Hydraulic mud enters to the upper end as shown in FIG. 1 and flows along the longitudinal axis of the inside bore 18 of drill pipe 10. Transmitting transducer 12 is disposed at a first position 20 across from receiving transducer 14 which is disposed at a second position 22. Transducers 12 and 14 are thus laterally disposed on and inside surface 16 of drill pipe 10. If an acoustic signal is applied to transmitting transducer 12, a corresponding sonic signal is injected into the acoustic media provided by the hydraulic mud within axial bore 18. The acoustic wave is transmitted in all directions and is particularly laterally across toward receiving transducer 22. However, since the acoustic wave is propagating in a moving media, it is received at a receiving transducer 14 with a higher apparent frequency than it was transmitted by transmitting transducer 12. The doppler shift of frequency is a direct and well known function of the velocity of the media or drilling mud within drill string bore 18.

Figure 2:
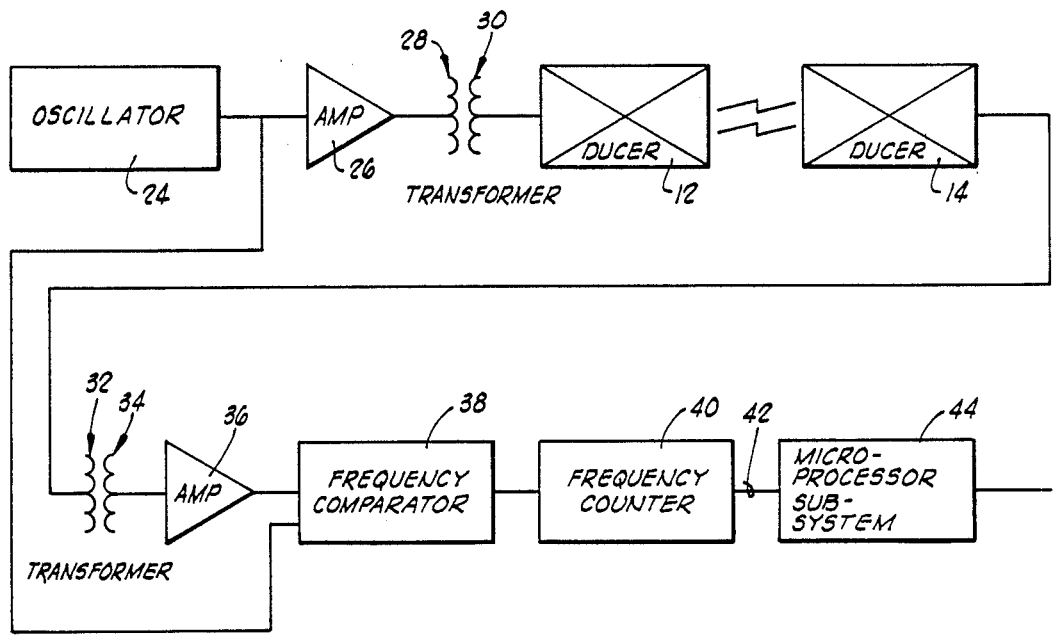
FIG. 2 is a block diagram of circuitry used in connection with the transducers shown in place within a drill string in FIG. 1.

Turn now to the sections of FIG. 2 wherein the methodology described above is implemented. An oscillator 24 driven by a conventional downhole ±18 volt power source, generates a 5 volt peak-to-peak output at a predetermined acoustic frequency. In the illustrated embodiment, frequencies in the range of 100 to 5000K Hz may be employed, although frequencies of 100 to 200K Hz are preferred. The output of oscillator 24 is coupled to the input of a drive amplifier 26. Drive amplifier 26 converts the oscillator output signal to a driving voltage coupled to the primary 28 of a center-tapped transformer. The drive signal, the output of drive amplifier 26, is AC coupled to the secondary 30 of the transformer which in turn is coupled to the input of transmitting transducer 12. The output from secondary 30 of the transformer is approximately 1000 volts across an impedance in the range of 100 meg to 1 meg ohm.

Transmitting transducer 12 is a conventional ceramic transducer well known to the art. The transducer provides good acoustic coupling to hydraulic mud within axial bore 18.

Transmitting transducer 12 is laterally separated from receiving transducer 14 by approximately two inches. It should be noted that according to the invention, the distance between transducers 12 and 14 is relatively small. Therefore, very little power is required between transducers 12 and 14 in order to transmit the acoustic frequency needed to measure the mud flow velocity within axial bore 18 of the drill string. In addition transducers 12 and 14 may be distantly separated from the well surface which is typically many thousands of feet away from the site of the transducers. Therefore, regardless of the distance from the well surface, a strong and unambiguous signal can be developed between transducers 12 and 14.

The acoustic wave propagates upward and across within bore 18 and is received by receive transducer 14. Again receiving transducer is a matching ceramic or piezoelectric polyvinyl difluoride transducer although any transducers now known or later devised may be suitably employed. The output of receiving transducer 14 in turn is coupled to the primary 32 of a transformer which AC couples the received signal to a secondary 34 of the transformer. The output of the transformer is thus impedance matched to the input of an amplifier 36. The output of the receive amplifier 36 is coupled to one input of a frequency comparator 38. A second input of frequency comparator 38 is similarly coupled to the output of oscillator 24. Therefore, the frequency of the transmitted signal is compared to the frequency of the received signal and the amount of frequency shift induced by the doppler frequency change between the transmitted and received signal is determined.

The output of frequency comparator 38 is coupled to the input of a conventional frequency counter 40 which converts the analog output of frequency comparator 38 into digital format. A digital signal, which is a measure of the doppler frequency shift is provided as a parallel digital signal at output line 42. Output line 42 is appropriately coupled to a digital processing system 44. Digital processing system 44 is a conventional microprocessor system well known to the art. Such systems typically include a data bus, address bus, command bus, microprocessor, coupled memories and a plurality of input/output peripherals. The details in architecture of digital processing system 44 are irrelevant to the scope of the invention and thus are not further described. In any case most MWD (measurement while drilling)

equipment includes such microprocessor systems as part of the instrumentation package. Therefore, what is contemplated is that the present invention will be included as an input peripheral to the standard on-board MWD instrumentation.

The frequency shift information is in any case made available to a microprocessor and is provided as a software input to conventional data processing from which the velocity of the hydraulic mud within axial bore 18 is calculated according to well understood physical principles.

According to the invention, the magnitude of the mud flow velocity can then be used according to any arbitrarily devised encoding scheme as a means of transmitting information downhole. For example, the range of mud flow velocities may be divided into a set of domains above or below a basal or reference rate. Each domain can then be mapped or associated with a unique and distinguishable information bit. For example, if the basal mud flow rate in a drill string is 100 gallons per minute, then for the purposes of information transfer, an increase of at least 8 gallons per minute and not more than 12 gallons per minute can be treated as corresponding to a cognizable incremental change in mud flow rate. One increment of change in the mud flow rate is then associated with a first predetermined information bit such as the digit "one," two increments of mud rate is associated with a second information bit, such as the digit "two"and so forth. Similarly, a decrease in increments of mud flow rate can be similarly associated with information digits such minus one, minus two and so forth. The mud flow rate is thus incremented or decremented for a predetermined data interval. In the illustrated embodiment, the data interval may be 0.5 second. Thus, the increase mud flow rate must be maintained for at least 0.5 second followed by a period of return to the basal rate for 0.5 seconds. During data transmission, if there is no increase or decrease of the basal rate, the information bit can be interpreted by the digital processing system 44 as a transmission of a 37 zero" information bit.

Figure 3:
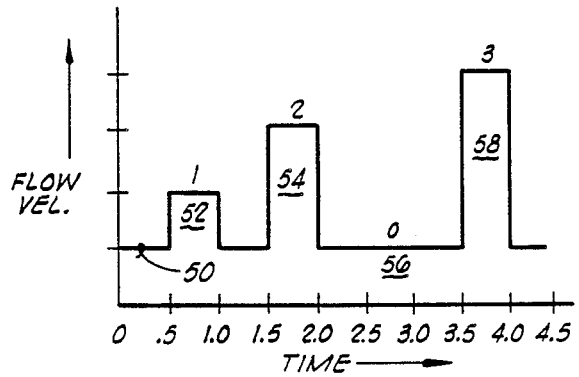
FIG. 3 is a graph illustrating flow velocity as a function of time according to the invention.

FIG. 3 is a simplified graph of mud flow velocities as a function of time. The vertical axis represents flow rate in arbitrary units, while the horizontal axis represents time marked out in 0.5 second intervals. The basal rate of flow 50 is set at a level above 0 gpm and is taken as the reference level. After a 0.5 second flow at the basal rate, the flow increased on increment of flow rate, e.g. gpm, and held at the increased rate for 0.5 seconds. This is a pulse 52 and is interpreted as a "1." After another 0.5 second interval the basal rate flow is again increased two increments of flow rate. This is denoted as pulse 54 and represents a "2." Thereafter 1.5 seconds pass at basal rate 50, which interpreted as a "0" or null pulse 56. Following another 0.5 seconds is pulse 58 of three increments of flow rate, held for the 0.5 second data interval, which is interpreted as a "3."

In the illustrated embodiment of the invention, a data interval of 1.0 seconds is employed, the first 0.5 seconds of which is used to transmit a selected flow rate of the drilling mud to the drill string, and the second 0.5 seconds of which is used as a quiescent period wherein the drilling mud returns to the basal flow rate. For example, during a first dead interval between 0.5 and 1.5 seconds, the flow rate is increased by first increment of 10 gallons per minute in excess of the basal flow rate. This can be represented as an information bit corresponded to the digit "one." During the second interval between 1.5 and 2.5 seconds, the drilling mud flow rate can again be increased by selecting the amount, for example, two increments of 10 gallons per minute and held for a predetermined period, approximately 0.4 to 5 seconds Thereafter, the flow rate again is return to the basal rate. Thus two increments increases then interpreted as corresponding to an information bit, namely the digit "two." During a third time interval between 2.5 and 3.5 seconds no increase in the drilling mud flow rate above the basal rate is effectuated. This would be interpreted as a "zero." Similarly, during a fourth sequential data time interval between 3.5 and 4.5 seconds, the drilling mud flow rate can be increased by three increments or 30 gallons per minute and similarly interpreted as a "three." A sequence of signals shown in FIG. 1, representing the word 37 one, two, zero, three," can be translated by a microprocessor within digital processing system 44 according to software control into a command which effectuates an arbitrarily designated downhole function. For example, the command, 1203, could be interpreted as a command to begin a coring operation. The fidelity of the information or the increments in flow can be insured by recognizing only those increases in flow signals that are held within predetermined bounds for a predetermined time intervals. For example, in the illustrated embodiment, the flow rate must be dept within its predetermined increased multiple plus and minus 10 percent for a minimum of 0.3 seconds otherwise the signal will be disregarded and treated as noise.

Many encoding protocols could be employed in addition to that described according the teaching of the invention, without departing from its scope.

Many alterations and modifications may be made by those having ordinary skill in the art without departing from the spirit and scope of the invention. The illustrated embodiment has been shown only for the purposes example and should not be taken as limiting the invention which is defined by the following claims.

What is claimed is:

1. An apparatus for communicating information between first and second locations remote from each other and linked by a fluid-conducting conduit containing a fluid flowing from said first location to said second location at a basal velocity in excess of zero, the majority of said conduit being disposed in a well bore, said apparatus comprising:
   means at said first location for selectively changing the velocity of said flowing fluid;
   means at said second location for:
   (a) measuring incremental changes in the fluid velocity;
   (b) determining whether said change increments fall within one of a plurality of predetermined ranges of error, each range of error including a unique upper and a unique lower flow rate bound, and each range of error being separated from a neighboring range of error by a non-zero range of fluid velocities;
   (c) associating each of at least three different measured fluid velocities whose change increment was determined to fall within one of said predetermined ranges of error, one of said at least three fluid velocities being the basal fluid velocity, with a predetermined unique information bit; and
   (d) assembling a plurality of said unique information bits into a word.

2. The apparatus of claim 1, wherein said measuring means further includes timing means for determining the period during which one of said at least three fluid velocities is maintained at a said incrementally-changed level within one of said predetermined ranges, and for rejecting any velocity which is maintained at said incrementally-changed level within one of said predetermined ranges for less than a predetermined period.

3. The apparatus of claim 2, wherein said changing means is adapted to effect said incremental changes as multiples of a predetermined, fixed, change increment.

4. A method for communicating information between first and second locations remote from each other and linked by a fluid-conducting conduit containing a fluid flowing from said first location to said second location at a basal velocity in excess of zero, the majority of said conduit being disposed in a well bore, said method comprising:

selectively changing the velocity of said flowing fluid at said first location to a plurality of different velocities by predetermined increments falling within one of a plurality of predetermined ranges of error, each range of error including a unique upper and a unique lower flow rate bound, and each range of error being separated from a neighboring range of error by a non-zero range of fluid velocities;

measuring said basal velocity and said selectively changed fluid velocities at said second location;

determining whether said incrementally changed velocities fall within one of said predetermined ranges of error at said second location;

associating each of at least three different measured fluid velocities whose change increment was determined to fall within one of said predetermined ranges of error, one of said at least three fluid velocities being the basal fluid velocity, at said second location with a predetermined, unique information bit; and assembling a plurality of said unique, predetermined information bits into a word.

5. The method of claim 4, wherein said step of measuring further includes the step of rejecting an incrementally-changed velocity which is maintained for less than a predetermined period of time.

6. The method of claim 5, wherein said step of selectively changing comprises changing said velocity by a multiple of a predetermined, fixed, change increment.

* * * * *